(12) United States Patent (10) Patent No.: US 7,675,529 B1
Brunner et al. (45) Date of Patent: Mar. 9, 2010

(54) METHOD AND APPARATUS TO SCALE GRAPHICAL USER INTERFACES

(75) Inventors: Ralph T. Brunner, Santa Clara, CA (US); Kristin Webster, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1097 days.

(21) Appl. No.: 10/374,248

(22) Filed: Feb. 25, 2003

(51) Int. Cl.
*G09G 5/00* (2006.01)
*G06F 17/00* (2006.01)
*G06F 17/20* (2006.01)

(52) U.S. Cl. .............. 345/661; 345/660; 715/244; 715/246; 715/249; 715/252; 715/254

(58) Field of Classification Search ............ 345/661, 345/660; 715/800, 244, 246, 249, 252–254
See application file for complete search history.

(56) References Cited

U.S. PATENT DOCUMENTS

| | | | | |
|---|---|---|---|---|
| 5,583,977 | A * | 12/1996 | Seidl | 345/619 |
| 5,815,160 | A * | 9/1998 | Kikuchi et al. | 345/661 |
| 6,211,855 | B1 * | 4/2001 | Kim | 345/660 |
| 6,396,507 | B1 * | 5/2002 | Kaizuka et al. | 345/661 |
| 6,456,305 | B1 * | 9/2002 | Qureshi et al. | 715/800 |
| 6,643,416 | B1 * | 11/2003 | Daniels et al. | 382/299 |
| 6,803,931 | B1 * | 10/2004 | Roman et al. | 715/800 |
| 6,825,860 | B1 * | 11/2004 | Hu et al. | 715/801 |
| 2002/0171690 | A1 * | 11/2002 | Fox et al. | 345/862 |
| 2003/0146934 | A1 * | 8/2003 | Bailey et al. | 345/765 |

* cited by examiner

*Primary Examiner*—M Good Johnson
(74) *Attorney, Agent, or Firm*—Blakely, Sokoloff, Taylor & Zafman LLP

(57) ABSTRACT

Methods and apparatuses to scale components of user interfaces. To scale a view component according to an arbitrary transformation, which may be represented by a scaling factor, a coordinate transformation, or other parameters, at least one embodiment of the present invention determines a new transformation for the view component so that, when the new transformation is used, the boundaries of the view components are aligned with pixel lines (and/or, other conditions are satisfied). In one aspect of the invention, a method to scale a view component of a Graphical User Interface includes: adjusting first layout parameters (e.g., coordinates of an origin, a width, a height, a coordinate of a boundary, and others), which correspond to a first transformation to scale the view component, to generate second layout parameters for the view component; and computing a second transformation from the second layout parameters to scale the view component. In one example according to this aspect, the view component is scaled using the second transformation; and a Current Transformation Matrix (CTM) is set according to the second transformation. According to the second layout parameters, the boundaries of the view component are aligned with pixel lines.

54 Claims, 10 Drawing Sheets

METHOD AND APPARATUS TO SCALE GRAPHICAL USER INTERFACES

FIELD OF THE INVENTION

The invention relates to graphical user interfaces, and more particularly to scaling components of graphical user interfaces.

BACKGROUND OF THE INVENTION

Typical graphical user interfaces are designed for display devices of standard resolutions. Until recently a "high resolution" display device typically had a large number of pixels on a large display area, when compared to a standard resolution display device. Thus, most display devices have similar numbers of pixels in a given size of a display area. However, recent developments in display devices, especially in high resolution LCD display panels, allow significantly more pixels to be displayed on an area of a fixed size. The pixel size of a high resolution display device is typically smaller than the pixel size of a low resolution display device. Thus, graphical user interfaces may appear too small to be interacted with when displayed on a high resolution display device without any modification. To enable legacy (existing) applications to run graphical user interfaces on high resolution displays, it is often desirable to scale the user interface components by an arbitrary non-integer factor.

FIGS. 2-3 show a scenario of displaying an image for a low resolution device on a high resolution device. Area 205 in FIG. 2 and area 305 in FIG. 3 have the same size. Block 201 in FIG. 2 represents the size of a pixel on the low resolution display device. Pixel image 203 shows a graphical user interface component displayed on the low resolution display device. Block 301 in FIG. 3 represents the size of a pixel on the high resolution display device. Pixel image 303 shows the same graphical user interface component displayed on the high resolution display device. The dimensions of pixel 301 of the high resolution display device are much smaller than the dimensions of pixel 201 of the low resolution display device. Thus, the high resolution device can display more pixels on the same area than the low resolution device. The pixel image designed for the low resolution device appears much smaller when displayed on the high resolution devices (e.g., pixel image 303 in FIG. 3 appears much smaller than pixel image 203 in FIG. 2). Graphical user interface components are typically designed in the unit of pixels. Thus, when the GUI components designed for a low resolution device is displayed on a high resolution device, the GUI components may appear too small to be comfortable for a user. It is often desirable to scale up the GUI components so that a user can comfortably interactive with the GUI components displayed on the high resolution display device.

When a window is scaled up by an arbitrary non-integer factor (e.g., 4/3≈1.3333), the boundaries of the components of the window may not align with the lines of pixels. The coordinates for the boundaries of the scaled up components may be real numbers instead of integer numbers (e.g., an original component of 100 pixels long may be scaled to 133.33 pixels long). Application developers typically lay out the original view hierarchy to align the boundaries of the components to the pixel lines in order to enable a number of optimizations, such as independent redrawing of views. If a scaled component of a view hierarchy is no longer aligned to pixel lines, drawing glitches can appear on view boundaries.

SUMMARY OF THE DESCRIPTION

Methods and apparatuses to scale components of user interfaces are described here.

To scale a view component according to an arbitrary transformation, which may be represented by a scaling factor, a coordinate transformation, or other parameters, at least one embodiment of the present invention determines a new transformation for the view component so that, when the new transformation is used, the boundaries of the view components are aligned with pixel lines (and/or, other conditions are satisfied).

In one aspect of the invention, a method to scale a view component of a Graphical User Interface includes: receiving a first transformation to scale the view component; determining first layout parameters (e.g., coordinates of an origin of the view component, a width of the view component, a height of the view component, a coordinate of a boundary of the view component, and others) for the view component using the first transformation; adjusting the first layout parameters to generate second layout parameters for the view component; and computing a second transformation from the second layout parameters to scale the view component. In one example according to this aspect, the view component is scaled using the second transformation; and a Current Transformation Matrix (CTM) is set according to the second transformation. After first coordinates for drawing a portion of the view component is received, second coordinates are computed from the first coordinates and the Current Transformation Matrix; and the portion of the view component is drawn using the second coordinates. According to the second layout parameters, the boundaries of the view component are aligned with pixel lines so that there is no rounding error for the boundaries of the view component when the second transformation is used. In one example, the first layout parameters are rounded from real values to integer values to align boundaries of the view components with pixel lines in adjusting the first layout parameters. Parameters, such as a size or a position of the view component, are adjusted to satisfy a geometric relation for the child view components of the parent view component of the view component. In one exemplary embodiment, this method may be performed by a computer's operating system for an application program's GUI components such that the transformation is transparent to the application program; the CTM transforms are in this case performed by the operating system rather than one or more application programs and the CTM allows an older application program (having GUI components designed for a lower resolution output device) to cause the output (e.g., display) to appear on a higher resolution output device.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
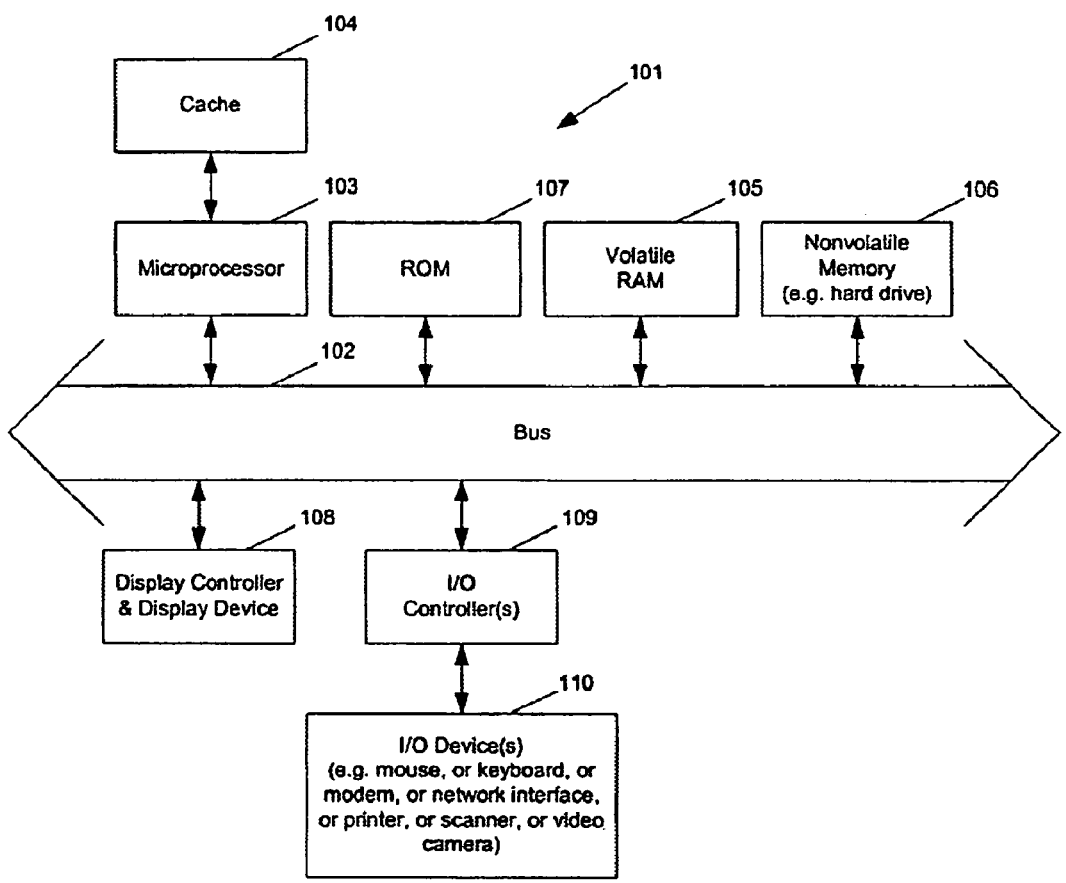
FIG. 1 shows a block diagram example of a data processing system which may be used with the present invention.
Figure 2:
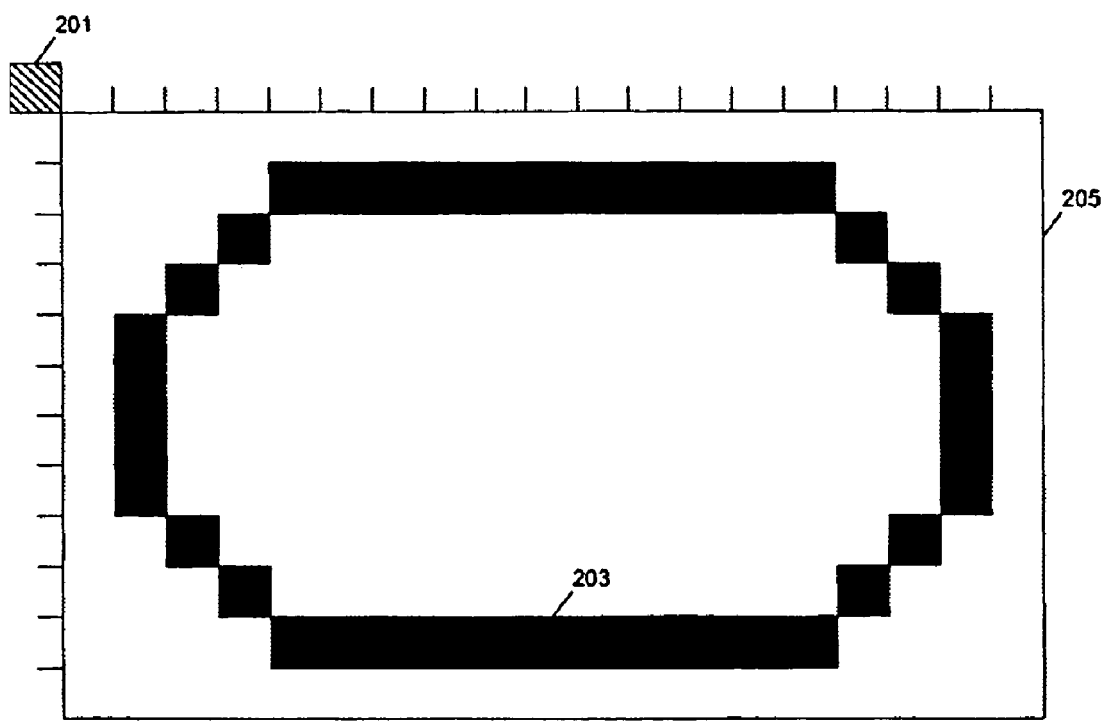
FIGS. 2-3 show a scenario of displaying an image for a low resolution device on a high resolution device.
Figure 3:
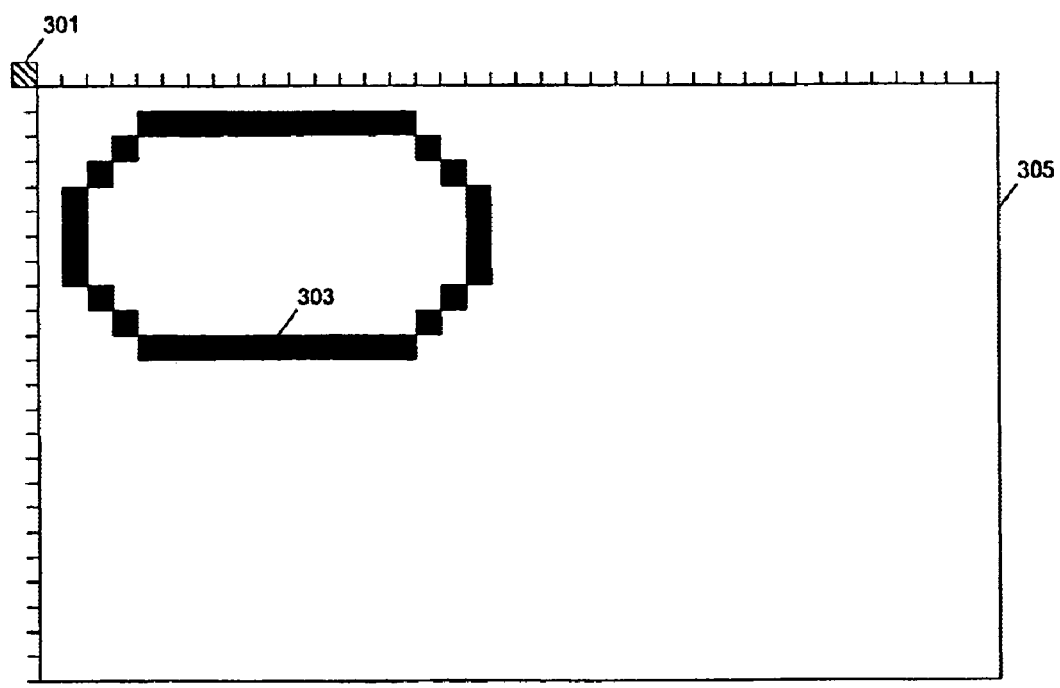

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108, which may be a high resolution display device, and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to determine new transformations for the child view components in scaling up the parent view so that, when the new transformations are used, the boundaries of the child view components are aligned with pixel lines and geometric constraints for the sizes and the positions of the child view components are preserved.

Figure 4:
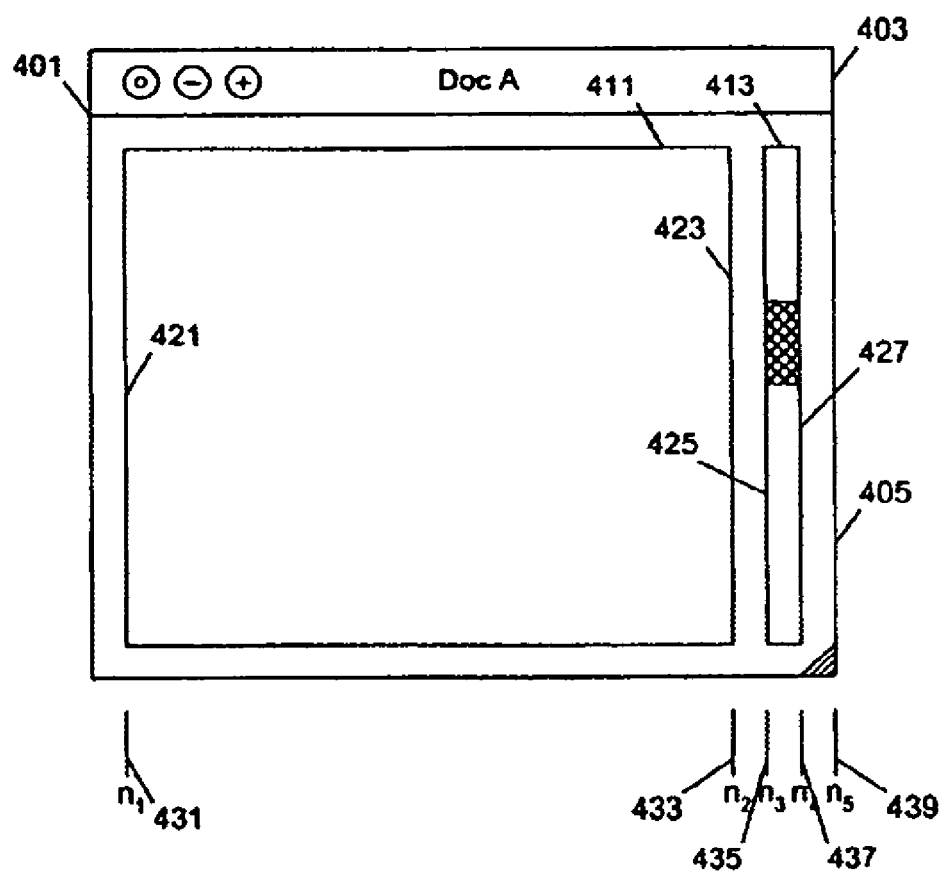
FIGS. 4-7 show scenarios of adjusting transformations for scaling graphical user interfaces components according to embodiments of the present invention.

FIGS. 4-7 show scenarios of adjusting transformations for scaling graphical user interfaces components according to embodiments of the present invention. FIG. 4 illustrates window 401 with its child view components: title bar 403 and main window 405. Main window 405 has its own child view components: text window 411 and scroll bar 413. Each of the view components occupies a rectangular region on the display device; and a child view component occupies a rectangular region within its parent view component. Typically, a graphical user interface is designed so that the boundaries of the view components are aligned with pixel lines. The coordinates of the boundaries of the view components are generally specified in pixels with integer numbers. For example, the x-coordinates of boundaries 421-427 are integers $n_1$~$n_4$. In FIG. 4, lines 431-439 represent the pixel lines at $x=n_1$, $n_2, \ldots, n_5$, respectively.

Figure 5:
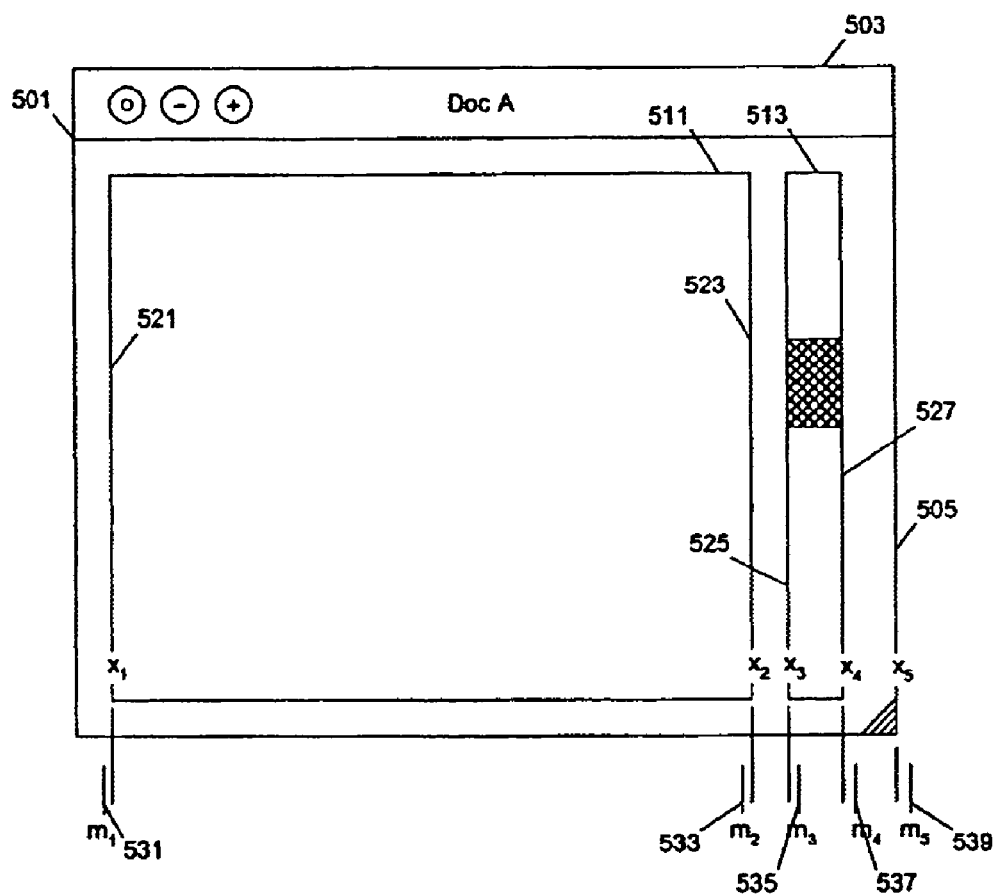

FIG. 5 illustrates a situation where window 401 of FIG. 4 is scaled up mathematically by a non-integer factor. After the right hand side boundary of main window 405 is scaled up from $x=n_5$ in FIG. 4 to the right hand side boundary of main window 505 at $x=x_5$ in FIG. 5, the boundaries of its child view components, text area 511 and scroll bar 513, are recomputed as $x_1$~$x_4$ respectively for boundaries 521-527. In general, $x_1$~$x_4$ are not integers. The closest integers for $x_1$~$x_5$ are $m_1$~$m_5$ respectively, as illustrated by lines 531-539 in FIG. 5. When window 501 is displayed, the coordinates of the boundaries of the components are rounded from $x_1$~$x_5$ to $m_1$~$m_5$ respectively. Window 501 of FIG. 5 becomes window 601 of FIG. 6 after the rounding operation. Since main window 605 and its child view components, text area 611 and scroll bar 613, are resized and repositioned due to the rounding operation, the Current Transformation Matrices (CTM) of these windows are recomputed from the coordinates of the corresponding boundaries (e.g., $m_1$~$m_5$) (or from other layout parameter, such as the origin, width, height of the view component). A Current Transformation Matrix of a view component defines the coordinate transformation for the view component from the original coordinates (e.g., $n_1$~$n_5$ in FIG. 4) to the scaled coordinates (e.g., $m_1$~$m_5$ in FIG. 6). Thus, the Current Transformation Matrix defines a transformation between the original coordinate system in which the application developer defines the structure of the graphical user interface and the display coordinate system in which points with integer coordinates can be directly mapped to the pixels on the display devices. Once the Current Transformation Matrix for the view component is defined, the coordinates for drawing the view component can be transformed from the original coordinates to the coordinates for the display device through the Current Transformation Matrix.

In one embodiment of the present invention, a view component makes system calls to instruct the window system, which may be considered part of the computer's operating system, to draw the contents of the view component using the original coordinates (e.g., $n_1$~$n_5$ in FIG. 4) according to the design of the application developers. The window system converts the original coordinates using the Current Transformation Matrix of the view component to the coordinates for the display device (e.g., $m_1$~$m_5$ in FIG. 6) to draw the scaled version of the view component (e.g., for display on a high resolution display device). After the window system determines the desirable transformation for the view component from a desirable scaling factor (or from the desirable transformation for the parent view component), the window system can scale the view component using the desirable transformation. Thus, the window system can enable the user to scale the graphical user interface of a legacy application without any modifications (or with small modifications) to the legacy application.

Figure 7:
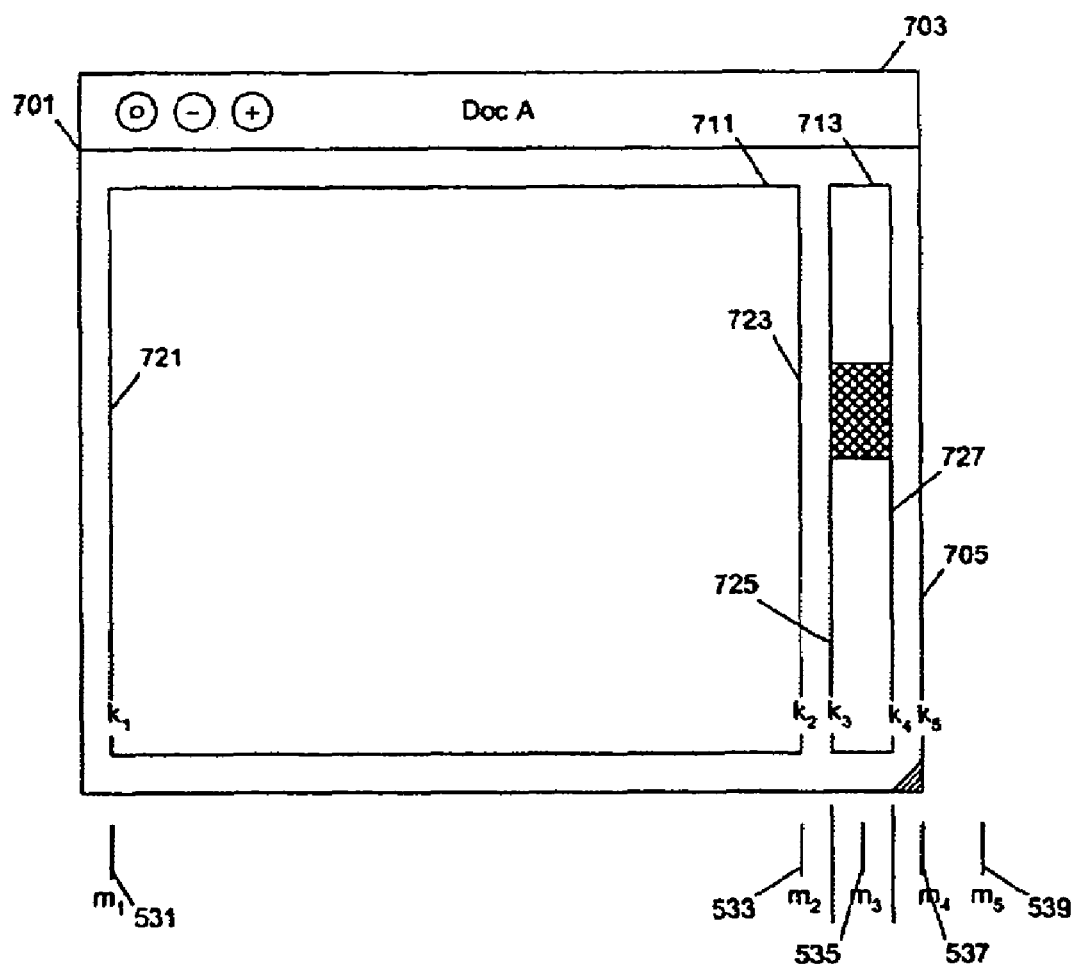

In one embodiment of the present invention, the window system further tunes the positions and the sizes of the child view components of a view component to satisfy certain geometric constraints (geometric relations) for the child view components. For example, text window 421 and scroll bar 427 have equal left and right margins (from the boundaries of the view components to the corresponding other nearest boundaries). Thus, the window system may further adjust the positions of boundaries 721-727 to $x=k_1, k_2, \ldots, k_4$ respectively in FIG. 7 so that such geometric relations are satisfied for view components 711 and 713. The window system may change the sizes of the child components. The window system may distribute the rounding errors among the child components and the parent component in adjusting the positions and sizes. In the example of FIG. 7, the size of parent view component 705 is also adjusted. In one embodiment of the present invention, the types of the view components are used for adjusting the sizes and positions of the view components. Most types of view components implicitly carry topology information that can be used for deriving rules for adjusting the sizes and positions. For example, main window 405 contains text window 411 and scroll bar 413. Main window 405 typically knows how to lay out text window 411 and scroll bar 413 when the size of main window 405 is changed. Typically, when the size of main window 405 is changed, the width of scroll bar 413 remains the same so that the width of scroll bar 413 is the same as other scroll bars on the system. Adjusting the width of text window 411 is generally less objectionable than changing the width of scroll bar 413. Thus, the sizes and the positions of text window 411 and scroll bar 413 can be adjusted so that the width of scroll bar 413 is the same as the other scroll bars in the system while widening or narrowing text window 411 accordingly. Since the types of some view components are known, an application does not have to explicitly supply such information in order to utilize such information in adjusting the sizes and positions of the view components. Thus, the types of these view components can be utilized for scaling without requiring changes in application software programs. It is understood that various different schemes for adjusting the sizes and positions of the view components can be used. In general, small dimensions, such as margins (or gaps) between child view components are more likely to be significantly distorted by rounding operations. Thus, a consistent scheme can be used to round off or adjust the coordinates of the boundaries of the child view components such that the ratios between smaller dimensions are substantially preserved.

Figure 6:
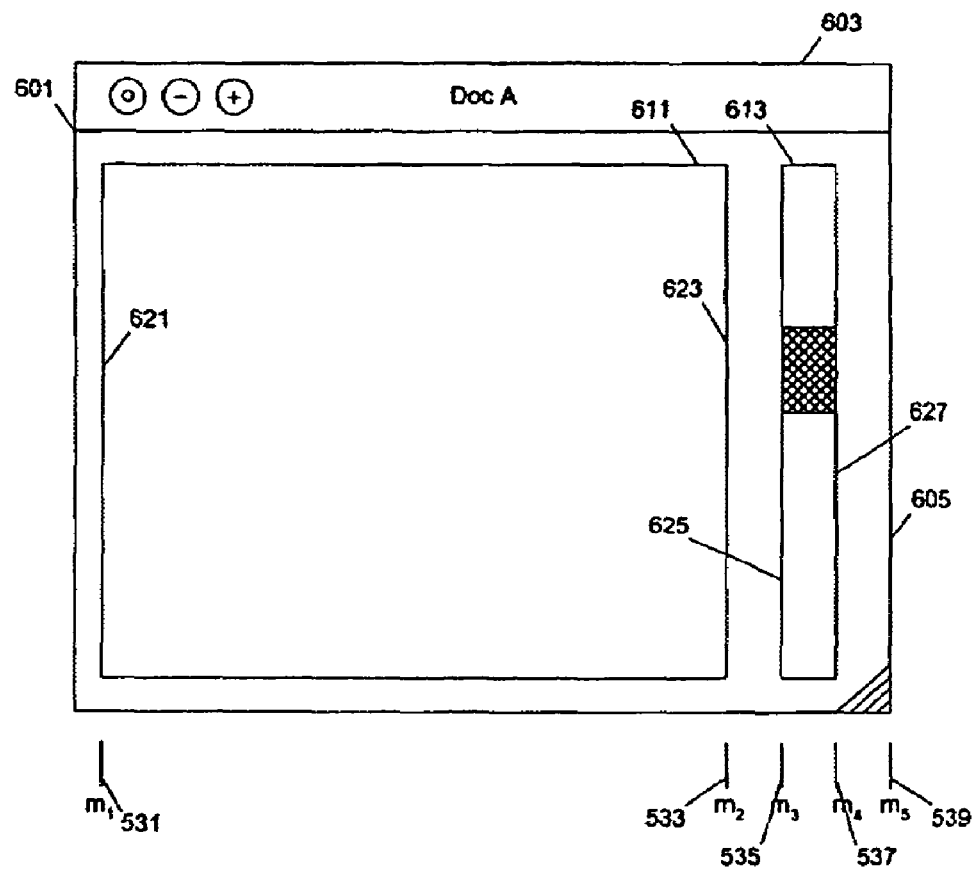

Although FIGS. 5 and 6 show a method to round the computed coordinates for view boundaries from real numbers to closest integers, it will be apparent to one skilled in the art from this description that various schemes can be used to round or adjust the boundaries from the computed coordinates. For example, after the coordinates of the boundaries are rounded to the corresponding next pixels, the positions of the boundaries are adjusted to preserve the geometric relations for the margins.

For example, in FIG. 4, boundary 423 of text window 411 and boundary 425 of scroll bar 413 may have the geometric relation: $n_2+1=n_3$. Thus, there are no lines of pixels between text window 411 and scroll bar 413. Consider that window 401 is scaled by a factor of two. The x-coordinate of boundary 423 becomes $m_2=2n_2$; and the x-coordinate of boundary 425 becomes $m_3=2n_3$. Since $2n_2+2=2n_3$, $m_2+2=m_3$. Thus, there is an extra line of pixels between the scaled text window and the scaled scroll bar after main window 405 is scaled by a factor of two. Since the text window is wider than scroll bar, the x-coordinate of boundary 423 can be adjusted to $m_2=2n_2+1$ so that $m_2+1=m_3$. After $m_2$ is adjusted to $2n_2+1$, there are no extra lines of pixels between the scaled text window and the scaled scroll bar; and the geometry constraint between the text window and the scroll bar is preserved.

Although FIGS. 4-7 illustrate an example through the transformation of x-coordinates, it is understood that, in general, scaling is performed in both the direction of width and the direction of height. In one embodiment of the present invention, the rounding and adjusting operations for the width direction and for the height direction are performed separately. In another embodiment of the present invention, the rounding and adjusting operations for both directions are related so that the distortion in the aspect ratios for small geometric features are reduced.

Figure 8:
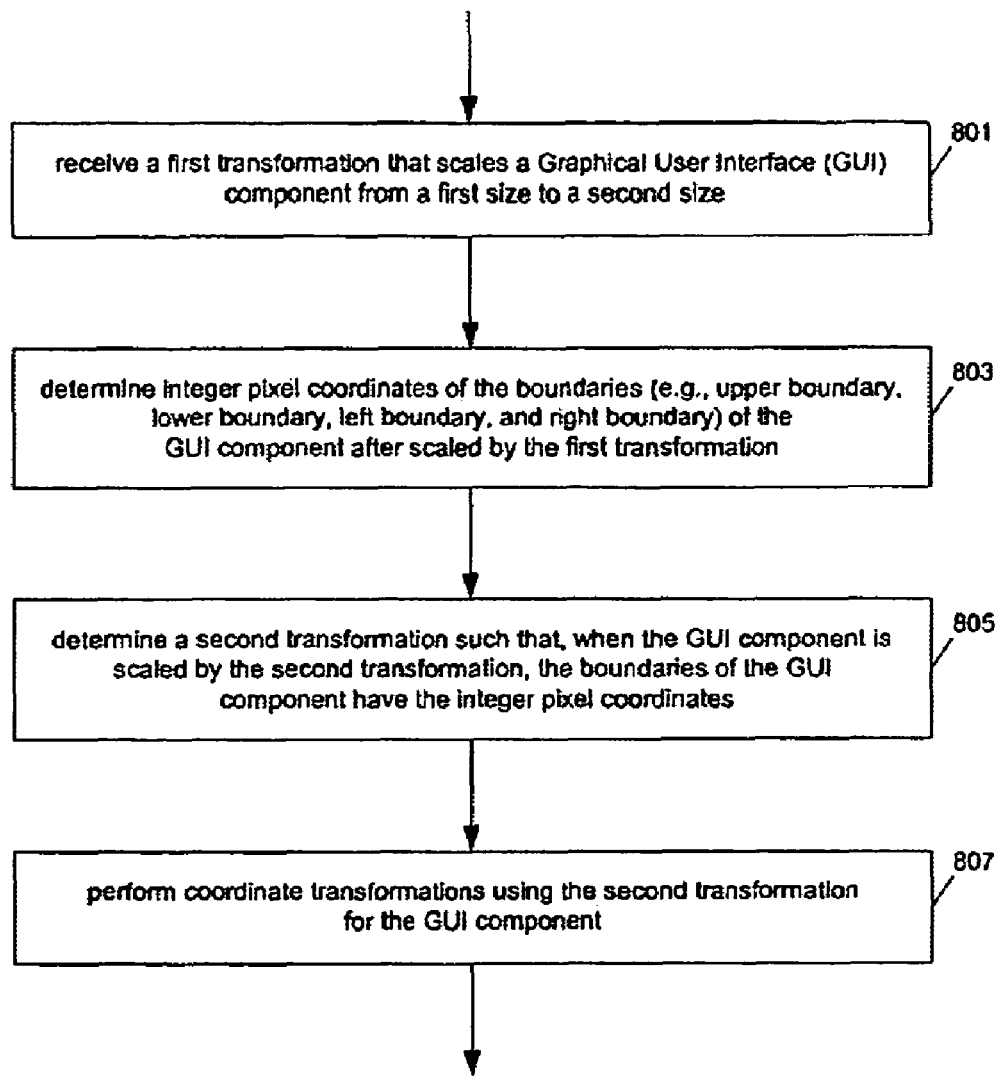
FIG. 8 shows a flow chart for a method to scale a view component according to one embodiment of the present invention.

FIG. 8 shows a flow chart for a method to scale a view component according to one embodiment of the present invention. After operation 801 receives a first transformation (e.g., a scaling factor, or a transformation matrix) that scales a Graphical User Interface (GUI) component from a first size to a second size, operation 803 determines integer pixel coordinates of the boundaries (e.g., upper boundary, lower boundary, left boundary, and right boundary) of the GUI component after the component is scaled by the first transformation. The integer pixel coordinates of the boundaries define in pixels the layout parameters (e.g., origin, width, height, horizontal offset, vertical offset, etc) of the view component within its parent view component. Operation 805 determines a second transformation such that, when the GUI component is scaled by the second transformation, the boundaries of the GUI component have the integer pixel coordinates. Thus, the second transformation aligns the boundaries of the scaled GUI component with pixels lines. Operation 807 performs coordinate transformations using the second transformation for the GUI component. For example, the window system can: a) convert the original coordinates submitted by the GUI component to scaled coordinates using the second transformation in drawing the GUI component; and/or b) convert the coordinates for events associated with locations on the screen (e.g., a location of a cursor when a mouse button is pressed) to the coordinates in the original coordinates system of the GUI component.

Figure 9:
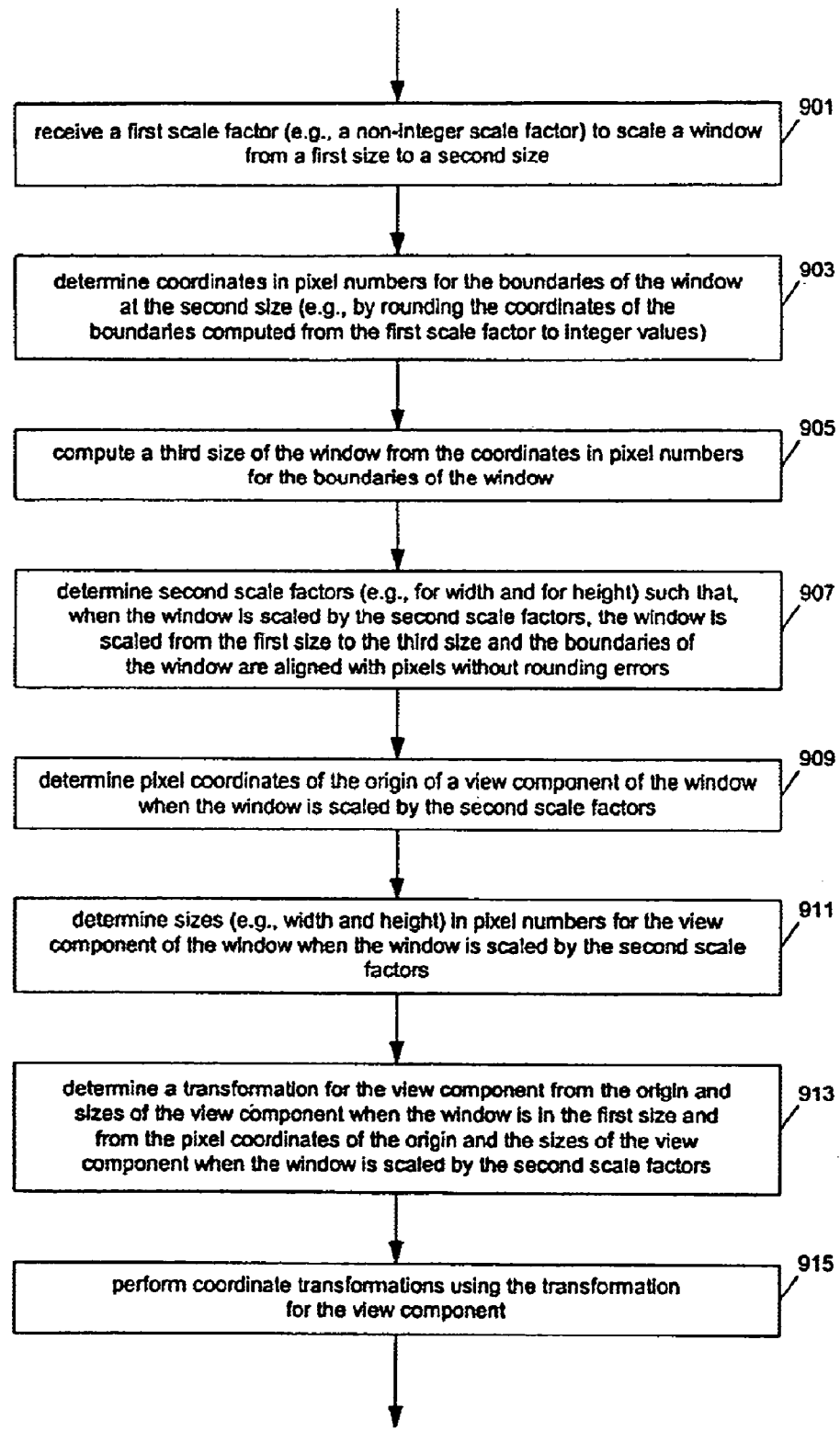
FIG. 9 shows a detailed flow chart for a method to scale a window according to one embodiment of the present invention.

FIG. 9 shows a detailed flow chart for a method to scale a window according to one embodiment of the present invention. After operations 901-907 determine a transformation for a window, operations 909-913 determine a transformation for a child component of the window.

After operation 901 receives a first scale factor (e.g., an arbitrary non-integer scale factor) to scale a window from a first size to a second size, operation 903 determines the coordinates in pixel numbers for the boundaries of the window at the second size (e.g., by rounding the real value coordinates of the boundaries computed from the first scale factor to integer value coordinates). Operation 905 computes a third size of the window from the coordinates in pixel numbers for the boundaries of the window. Operation 907 determines second scale factors (e.g., for width and for height) such that, when the window is scaled by the second scale factors, the window is scaled from the first size to the third size and the boundaries of the window are aligned with pixels without rounding errors.

Once the transformation for the window is determined, operation 909 determines pixel coordinates of the origin of a view component of the window when the window is scaled by the second scale factors. Operation 911 determines sizes (e.g., width and height) in pixel numbers for the view component of the window when the window is scaled by the second scale factors. Operation 913 determines a transformation for the view component from: a) the origin and the sizes of the view component when the window is in the first size; and, b) from the pixel coordinates of the origin and the sizes of the view component when the window is scaled by the second scale factors. Operation 915 performs coordinate transformations using the transformation for the view component.

Operations 909-915 can be performed repeatedly for all the child view components of the window and, recursively, for the children of the child view components. Further, geometric relations for the child view components can be considered in determining the origins and the sizes of the child view components in operations 909-911.

Figure 10:
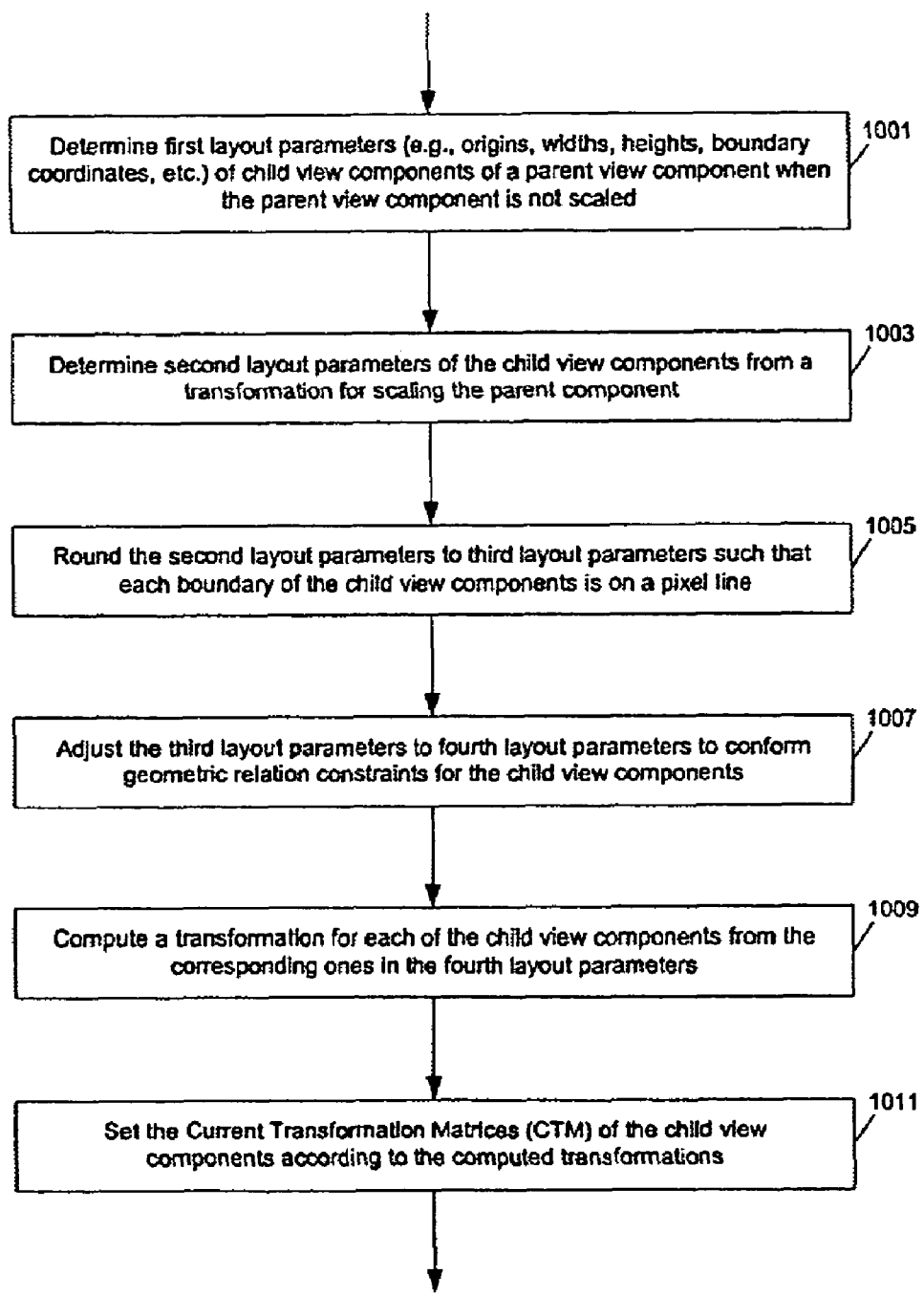
FIG. 10 shows a detailed flow chart for a method to determine a transformation for a child view component according to one embodiment of the present invention.

FIG. 10 shows a detailed flow chart for a method to determine a transformation for a child view component according to one embodiment of the present invention. Operation 1001 determines first layout parameters (e.g., origins, widths, heights, boundary coordinates, etc.) of child view components of a parent view component when the parent view component is not scaled. In one embodiment of the present invention, the first layout parameters are examined to determine geometric relations. Operation 1003 determines second layout parameters of the child view components from a transformation for scaling the parent component. Typically, the transformation for scaling the parent component is specified with one or more real numbers. Thus, the second layout parameters are real numbers computed using the transformation. Operation 1005 rounds the second layout parameters to third layout parameters such that each boundary of the child view components is on a pixel line. Operation 1007 further adjusts the third layout parameters to generate fourth layout parameters to conform geometric relation constraints for the child view components, such as the geometric relation constraints determined from examining the first layout parameters. For example, if there is no gap between two child components when the parent view component is not scaled, there is no gap between the scaled version of the child components; if there are several slim child components (e.g., slider controls) of a same size according to the first layout parameters, the fourth layout parameters are generated such that the scaled version of these slim child components have a same size. After operation 1009 computes a transformation for each of the child view components from the corresponding ones in the fourth layout parameters, operation 1011 sets the Current Transformation Matrices of the child view components according to the computed transformations. In one embodiment of the present invent, once a window system sets up the Current Transformation Matrices for the view components of a window, the window system can perform coordinate transformations between: a) the coordinate system used by the view components, in which the view components are designed by the application developers, and b) the screen coordinate system, in which the window system displays the graphical user interface on a display device (e.g., a high resolution LCD display panel) for interaction with users. It will be appreciated that the GUI components which are transformed for display (or other output) on a high resolution output device are components with which a user interacts. They are usually not merely graphics. These components are user activatable controls which are activated by a user's interaction with the component. This interaction is often the selection of the control by positioning a cursor controlled by a mouse over the component and pressing a button, such as a button on the mouse. This interaction is detected through a reverse transformation from the screen coordinates back to the original coordinate system used by the view components.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to scale a view component of a Graphical User Interface on a data processing system, the method comprising:

receiving a first transformation in memory, the first transformation representing a first mathematical expression for a coordinate transformation to scale the view component having layout parameters with values from an original display resolution to a different display resolution, wherein the view component is operative for controlling the Graphical User Interface by a user;

determining first values of the layout parameters for the view component by applying the coordinate transformation to values of the layout parameters for the original display resolution according to the first transformation to produce the first values of the layout parameters;

adjusting the first values of the layout parameters to generate second values of the layout parameters for the view component;

computing a second transformation from the second values of the layout parameters via a processor coupled to the memory, the second transformation representing a second mathematical expression to apply the coordinate transformation to the view component to scale the view component; and displaying the scaled view component on a display device coupled to the processor, the display device having the different display resolution for output of the Graphical User Interface.

2. A method as in claim 1 further comprising:
scaling the view component by applying the coordinate transformation according to the second transformation.

3. A method as in claim 2 further comprising:
setting a Current Transformation Matrix (CTM) according to the second transformation.

4. A method as in claim 3 wherein said scaling the view component comprises:
receiving first coordinates to draw a portion of the view component;
computing second coordinates from the first coordinates and the Current Transformation Matrix; and
drawing the portion of the view component using the second coordinates.

5. A method as in claim 1 wherein boundaries of the view component according to the second values of the layout parameters are aligned with pixel lines.

6. A method as in claim 1 wherein said adjusting the first values of the layout parameters comprises:
rounding the first values of the layout parameters from real values to integer values to align boundaries of the view components with pixel lines.

7. A method as in claim 6 wherein said view component comprises parent and child view components, and said adjusting the first values of the layout parameters further comprises:
adjusting a size of the view component to satisfy a geometric relation for child view components of a parent view component of the view component.

8. A method as in claim 6 wherein said view component comprises parent and child view components, and said adjusting the first values of the layout parameters further comprises:
adjusting a position of the view component to satisfy a geometric relation for child view components of a parent view component of the view component.

9. A method as in claim 1 wherein the layout parameters comprise at least one of:
coordinates of an origin of the view component;
a width of the view component;
a height of the view component; and
a coordinate of a boundary of the view component.

10. A machine readable storage medium containing executable computer program instructions which when executed by a data processing system cause said system to perform a method to scale a view component of a Graphical User Interface on the data processing system, the method comprising:

receiving a first transformation in memory, the first transformation representing a first mathematical expression for a coordinate transformation to scale the view component having layout parameters with values from an original display resolution to a different display resolution, wherein the view component is operative for controlling the Graphical User Interface by a user;

determining first values of the layout parameters for the view component by applying the coordinate transformation to the values of the layout parameters for the original display resolution according to the first transformation to produce the first values of the layout parameters;

adjusting the first values of the layout parameters to generate second values of the layout parameters for the view component;

computing a second transformation from the second values of the layout parameters via a processor coupled to the memory, the second transformation representing a second mathematical expression to apply the coordinate transformation to the view component to scale the view component; and displaying the scaled view component on a display device coupled to the processor, the display device having the different display resolution for output of the Graphical User Interface.

11. A storage medium as in claim 10 wherein the method further comprises:
scaling the view component by applying the coordinate transformation according to the second transformation.

12. A storage medium as in claim 11 wherein the method further comprises:
setting a Current Transformation Matrix (CTM) according to the second transformation.

13. A storage medium as in claim 12 wherein said scaling the view component comprises:
receiving first coordinates to draw a portion of the view component;
computing second coordinates from the first coordinates and the Current Transformation Matrix; and
drawing the portion of the view component using the second coordinates.

14. A storage medium as in claim 10 wherein boundaries of the view component according to the second values of the layout parameters are aligned with pixel lines.

15. A storage medium as in claim 10 wherein said adjusting the first values of the layout parameters comprises:
rounding the first values of the layout parameters from real values to integer values to align boundaries of the view components with pixel lines.

16. A storage medium as in claim 15 wherein said view component comprises parent and child view components, and said adjusting the first values of the layout parameters further comprises:
adjusting a size of the view component to satisfy a geometric relation for child view components of a parent view component of the view component.

17. A storage medium as in claim 15 wherein said view component comprises parent and child view components, and said adjusting the first values of the layout parameters further comprises:
adjusting a position of the view component to satisfy a geometric relation for child view components of a parent view component of the view component.

18. A storage medium as in claim 10 wherein the layout parameters comprise at least one of:
coordinates of an origin of the view component;
a width of the view component;
a height of the view component; and
a coordinate of a boundary of the view component.

19. A data processing system to scale a view component of a Graphical User Interface, the data processing system comprising:
means for receiving a first transformation in memory, the first transformation representing a first mathematical expression for a coordinate transformation to scale the view component having layout parameters with values from an original display resolution to a different display resolution, wherein the view component is operative for controlling the Graphical User Interface by a user;
means for determining first values of the layout parameters for the view component by applying the coordinate transformation to the values of the layout parameters for the original display resolution according to the first transformation to produce the first values of the layout parameters;
means for adjusting the first values of the layout parameters to generate second values of the layout parameters for the view component;
means for computing a second transformation from the second values of the layout parameters via a processor coupled to the memory, the second transformation representing a second mathematical expression to apply the coordinate transformation to the view component to scale the view component; and
means for displaying the scaled view component on a display device coupled to the processor, the display device having the different display resolution for output of the Graphical User Interface.

20. A data processing system as in claim 19 further comprising:
means for scaling the view component by applying the coordinate transformation according to the second transformation.

21. A data processing system as in claim 20 further comprising:
means for setting a Current Transformation Matrix (CTM) according to the second transformation.

22. A data processing system as in claim 21 wherein said means for scaling the view component comprises:
means for receiving first coordinates to draw a portion of the view component;
means for computing second coordinates from the first coordinates and the Current Transformation Matrix; and
means for drawing the portion of the view component using the second coordinates.

23. A data processing system as in claim 19 wherein boundaries of the view component according to the second values of the layout parameters are aligned with pixel lines.

24. A data processing system as in claim 19 wherein said means for adjusting the first values of the layout parameters comprises:
means for rounding the first values of the layout parameters from real values to integer values to align boundaries of the view components with pixel lines.

25. A data processing system as in claim 24 wherein said view component comprises parent and child view components, and said means for adjusting the first values of the layout parameters further comprises:
means for adjusting a size of the view component to satisfy a geometric relation for child view components of a parent view component of the view component.

26. A data processing system as in claim 24 wherein said view component comprises parent and child view components, and said means for adjusting the first values of the layout parameters further comprises:
means for adjusting a position of the view component to satisfy a geometric relation for child view components of a parent view component of the view component.

27. A data processing system as in claim 19 wherein the layout parameters comprise at least one of:
a) coordinates of an origin of the view component;
b) a width of the view component;
c) a height of the view component; and
d) a coordinate of a boundary of the view component.

28. A method to scale a view component of a Graphical User Interface on a data processing system, the method comprising:
adjusting first values of layout parameters to generate second values of the layout parameters for the view component, the first values of the layout parameters corresponding to a first transformation in memory for a coordinate transformation to scale the view component from an original display resolution to a different display resolution, the first transformation representing a first mathematical expression for the coordinate transformation, the first values of the layout parameter produced by applying the coordinate transformation to values of the layout parameters for the original display resolution according to the first transformation, wherein the view component is operative for controlling the Graphical User Interface by a user;
computing a second transformation from the second values of the layout parameters via a processor coupled to the memory, the second transformation representing a second mathematical expression for the coordinate transformation to apply the coordinate transformation to the view component to scale the view component; and
displaying the scaled view component on a display device coupled to the processor, the display device having the different display resolution for output of the Graphical User Interface.

29. A method as in claim 28 further comprising:
scaling the view component by applying the coordinate transformation according to the second transformation.

30. A method as in claim 29 further comprising:
setting a Current Transformation Matrix (CTM) according to the second transformation.

31. A method as in claim 30 wherein said scaling the view component comprises:
receiving first coordinates to draw a portion of the view component;
computing second coordinates from the first coordinates and the Current Transformation Matrix; and
drawing the portion of the view component using the second coordinates.

32. A method as in claim 28 wherein boundaries of the view component according to the second values of the layout parameters are aligned with pixel lines.

33. A method as in claim 28 wherein said adjusting the first values of the layout parameters comprises:
rounding the first values of the layout parameters from real values to integer values to align boundaries of the view components with pixel lines.

34. A method as in claim 33 wherein said view component comprises parent and child view components, and said adjusting the first values of the layout parameters further comprises:
adjusting a size of the view component to satisfy a geometric relation for child view components of a parent view component of the view component.

35. A method as in claim 33 wherein said view component comprises parent and child view components, and said adjusting the first values of the layout parameters further comprises:
adjusting a position of the view component to satisfy a geometric relation for child view components of a parent view component of the view component.

36. A method as in claim 28 wherein the layout parameters comprise at least one of:
coordinates of an origin of the view component;
a width of the view component;
a height of the view component; and
a coordinate of a boundary of the view component.

37. A machine readable storage medium containing executable computer program instructions which when executed by a data processing system cause said system to perform a method to scale a view component of a Graphical User Interface on the data processing system, the method comprising:
adjusting first values of layout parameters to generate second values of the layout parameters for the view component, the first values of the layout parameters corresponding to a first transformation in memory for a coordinate transformation to scale the view component from an original display resolution to a different display resolution, the first transformation representing a first mathematical expression for the coordinate transformation, the first values of the layout parameter produced by applying the coordinate transformation to values of the layout parameters for the original display resolution according to the first transformation, wherein the view component is operative for controlling the Graphical User Interface by a user;
computing a second transformation from the second values of the layout parameters via a processor coupled to the memory, the second transformation representing a second mathematical expression to apply the coordinate transformation to the view component to scale the view component; and
displaying the scaled view component on a display device coupled to the processor, the display device having the different resolution for output of the Graphical User Interface.

38. A storage medium as in claim 37 wherein the method further comprises:
scaling the view component by applying the coordinate transformation according to the second transformation.

39. A storage medium as in claim 38 wherein the method further comprises:
setting a Current Transformation Matrix (CTM) according to the second transformation.

40. A storage medium as in claim 39 wherein said scaling the view component comprises:
receiving first coordinates to draw a portion of the view component;
computing second coordinates from the first coordinates and the Current Transformation Matrix; and
drawing the portion of the view component using the second coordinates.

41. A storage medium as in claim 37 wherein boundaries of the view component according to the second values of the layout parameters are aligned with pixel lines.

42. A storage medium as in claim 37 wherein said adjusting the first values of the layout parameters comprises:
rounding the first values of the layout parameters from real values to integer values to align boundaries of the view components with pixel lines.

43. A storage medium as in claim 42 wherein said view component comprises parent and child view components, and said adjusting the first values of the layout parameters further comprises:
adjusting a size of the view component to satisfy a geometric relation for child view components of a parent view component of the view component.

44. A storage medium as in claim 42 wherein said view component comprises parent and child view components, and said adjusting the first values of the layout parameters further comprises:
adjusting a position of the view component to satisfy a geometric relation for child view components of a parent view component of the view component.

45. A storage medium as in claim 37 wherein the layout parameters comprise at least one of:
coordinates of an origin of the view component;
a width of the view component;
a height of the view component; and
a coordinate of a boundary of the view component.

46. A data processing system to scale a view component of a Graphical User Interface, the data processing system comprising:
memory storing first values of layout parameters, the first values of the layout parameters corresponding to a first transformation for a coordinate transformation to scale the view component from an original display resolution to a different display resolution, the first transformation representing a first mathematical expression, the first values of the layout parameter produced by applying the coordinate transformation to values of the layout parameters for the original display resolution according to the first transformation, wherein the view component is operative for controlling the Graphical User Interface by a user;
a processor coupled to the memory, the processor adjusting the first values of the layout parameters to generate second values of the layout parameters for the view component, the processor computing a second transformation from the second values of the layout parameters, the second transformation representing a second mathematical expression to apply the coordinate transformation to the view component to scale the view component for output of the Graphical User Interface on a display device having the different display resolution.

47. A data processing system as in claim 46 wherein the processor scales the view component by applying the coordinate transformation according to the second transformation.

48. A data processing system as in claim 47 wherein the processor sets a Current Transformation Matrix (CTM) according to the second transformation.

49. A data processing system as in claim 48 wherein the processor computes second coordinates from the Current Transformation Matrix and first coordinates which specify a portion of the view component, and draws the portion of the view component using the second coordinates.

50. A data processing system as in claim 46 wherein boundaries of the view component according to the second values of the layout parameters are aligned with pixel lines.

51. A data processing system as in claim 46 wherein, to generate the second values of the layout parameters, the processor rounds the first values of the layout parameters from real values to integer values to align boundaries of the view components with pixel lines.

52. A data processing system as in claim 51 wherein said view component comprises parent and child view components, and wherein, to generate the second values of the layout parameters, the processor adjusts a size of the view component to satisfy a geometric relation for child view components of a parent view component of the view component.

53. A data processing system as in claim 51 wherein said view component comprises parent and child view components, and wherein, to generate the second values of the layout parameters, the processor adjusts a position of the view component to satisfy a geometric relation for child view components of a parent view component of the view component.

54. A data processing system as in claim 46 wherein the layout parameters comprise at least one of:
coordinates of an origin of the view component;
a width of the view component;
a height of the view component; and
a coordinate of a boundary of the view component.

* * * * *